US012546156B2

(12) United States Patent
Lee

(10) Patent No.: US 12,546,156 B2
(45) Date of Patent: Feb. 10, 2026

(54) RATCHETING ADJUSTABLE TOP BRACKET ASSEMBLY FOR A MOVABLE BARRIER

(71) Applicant: Overhead Door Corporation, Lewisville, TX (US)

(72) Inventor: Bradley J. Lee, Arlington, TX (US)

(73) Assignee: Overhead Door Corporation, Lewisville, TX (US)

(*) Notice: Subject to any disclaimer, the term of this patent is extended or adjusted under 35 U.S.C. 154(b) by 426 days.

(21) Appl. No.: 18/071,343

(22) Filed: Nov. 29, 2022

(65) Prior Publication Data

US 2024/0175305 A1 May 30, 2024

(51) Int. Cl.
*E05D 15/16* (2006.01)

(52) U.S. Cl.
CPC .................................. *E05D 15/165* (2013.01)

(58) Field of Classification Search
CPC .......... E05D 2015/1026; E05D 15/165; E05D 15/242; E05D 15/24; E05D 1/04; E05Y 2900/106; E05Y 2201/64
See application file for complete search history.

(56) References Cited

U.S. PATENT DOCUMENTS 2,059,585 A * 11/1936 Kelly .................... E05D 15/248 160/209
2,525,309 A * 10/1950 Norberg ................ E05D 15/242 16/104
2,655,683 A * 10/1953 Mckee .................. E05D 15/242 16/104
2,703,141 A * 3/1955 Mckee .................. E05D 15/165 16/104
2,877,843 A * 3/1959 Stroup .................. E05D 15/165 16/98
2,883,697 A * 4/1959 Stroup .................. E05D 15/242 49/223
2,980,182 A * 4/1961 Stroup .................. E05D 15/165 16/97
3,447,192 A 6/1969 Pemberton
3,457,983 A * 7/1969 Pemberton ............ E05D 15/165 16/265
4,115,900 A * 9/1978 Mihalcheon .......... E05D 15/242 16/104

(Continued)

OTHER PUBLICATIONS

Airlift Doors, Inc., Alaska Polycarbonate Door Product Catalog, dated before Aug. 16, 2022, pp. 1-3, 19, 64.

(Continued)

*Primary Examiner* — Johnnie A. Shablack
(74) *Attorney, Agent, or Firm* — Haynes and Boone, LLP

(57) ABSTRACT

A roller bracket assembly for a movable barrier includes a base bracket coupled to the movable barrier and a roller holder bracket. The roller holder bracket is rotatably coupled to the base bracket. The roller bracket assembly further includes a support bracket. The roller holder bracket includes multiple ratcheting features configured to engage with corresponding ratcheting features of the support bracket. The ratcheting features of the roller holder bracket and the support bracket allow movement of the roller holder bracket away from the movable barrier rotating relative to the base bracket, but prevent movement of the roller holder bracket toward the movable barrier.

16 Claims, 10 Drawing Sheets

(56) References Cited

U.S. PATENT DOCUMENTS

| | | | | | |
|---|---|---|---|---|---|
| 4,924,932 | A * | 5/1990 | Esnault | E05D 15/165 160/235 |
| 5,553,651 | A * | 9/1996 | Olsen | E06B 3/485 160/235 |
| 5,566,740 | A * | 10/1996 | Mullet | E06B 3/485 160/229.1 |
| 6,843,300 | B2 * | 1/2005 | Mullet | E05D 15/242 160/229.1 |
| 7,454,815 | B2 * | 11/2008 | Brinkmann | E05D 15/24 16/271 |
| 11,060,335 | B2 * | 7/2021 | Yost | E05D 11/00 |

OTHER PUBLICATIONS

Finishline Garage Doors, photographs of garage door taken before Aug. 16, 2022, 1 page.

* cited by examiner

RATCHETING ADJUSTABLE TOP BRACKET ASSEMBLY FOR A MOVABLE BARRIER

TECHNICAL FIELD

The present disclosure relates generally to the field of movable barriers. In particular, an adjustable top bracket assembly for a movable barrier includes ratcheting features which hold a roller holder bracket in place during installation.

BACKGROUND

Movable barriers, such as upward-acting sectional or single panel garage doors, residential and commercial rollup doors, and slidable and swingable gates, are used to alternatively allow and restrict entry to building structures and property. An upward-acting slidable barrier typically includes rollers positioned on either side of the barrier which roll along a track. Each roller is secured to the barrier with a roller bracket. In a closed position, the barrier is positioned vertically and the track is angled from the barrier extending upward. In this way, the distance between the barrier and the track increases with vertical height and the roller brackets are selected to maintain the angle between the track and the barrier in a closed position.

A top bracket assembly of movable barriers may be adjustable. This adjustability accounts for differences in dimension of the movable barrier or corresponding tracks. In this way, the angle between the tracks and the movable barrier is maintained. However, typical adjustable top bracket assemblies include multiple components. During installation, an installer is often elevated, for example by a ladder, to reach the upper portion of the movable barrier. The installer is required to position a roller within the track with the roller stem in a roller holder of a bracket, move this bracket away from the movable barrier (e.g., by pushing the movable barrier against the wall), and while keeping each of these components in place, drive a fastener, such as a screw, through the brackets. Performing each of these tasks is often difficult, leading to increased installation time.

SUMMARY

In an example aspect, the present disclosure is directed to a roller bracket assembly for a movable barrier having a surface. The roller bracket assembly may include a base configured to be coupled to the movable barrier. The base may include one of a socket or pivot head of a joint. The roller bracket assembly also may include a roller holder bracket including a first end comprising the other of the socket or pivot head of the joint, with the roller holder bracket being rotatably coupled to the base via the joint. The roller holder bracket also may include a first roller tube supported by the first end and spaced from the surface of the movable barrier, with the roller tube configured to receive a roller stem.

In some aspects, the roller holder bracket further comprises a second end configured to be coupled to the movable barrier. In some aspects, the roller bracket assembly comprises a support bracket attachable to the roller holder bracket. In some aspects, the support bracket comprises an inner surface having first interlocking features; and the roller holder bracket comprises an outer surface having second interlocking features and interlocks to attach the support bracket to the roller holder bracket. In some aspects, the first interlocking features of the inner surface of the support bracket and the second interlocking features of the outer surface of the roller holder bracket are selectively lockable to allow movement of the roller holder bracket away from the surface of the movable barrier and prevent movement of the roller holder bracket toward the surface of the movable barrier. In some aspects, the first interlocking features of the inner surface of the support bracket include ratchet protrusions, and wherein the second interlocking features of the outer surface of the roller holder bracket include ratchet grooves. In some aspects, the protrusion of the support bracket and the groove of the movable barrier form a pivotable fulcrum. In some aspects, the roller bracket assembly further comprises a bias element positioned between the support bracket and the movable barrier and configured to urge the inner surface of the support bracket toward the outer surface of the roller holder bracket. In some aspects, the support bracket comprises an outer surface having a plurality of grooves. In some aspects, the roller holder bracket comprises an inner surface having a channel, the channel configured to receive a nut and prevent the nut from rotating within the channel. In some aspects, the first end of the roller holder bracket includes an opening configured to receive a fastener disposed to prevent rotation of the roller holder bracket. In some aspects, the roller holder bracket further comprises a second roller tube configured to receive the roller stem.

In another example aspect, the present disclosure is directed to a method of assembling a movable barrier system. The method may include: positioning a roller within a track of the movable barrier system; coupling a base bracket to a surface of a movable barrier, the base bracket comprising one of a socket or pivot head of a joint; coupling a support bracket to the movable barrier, the support bracket including an inner surface; positioning a roller holder bracket relative to the base bracket, the roller holder bracket comprising a first end having the other of the socket or pivot head of the joint; coupling an outer surface of the roller holder bracket to an inner surface of the upper bracket; and introducing a roller stem of the roller into a roller tube of the roller holder bracket.

In some aspects, the inner surface of the upper bracket comprises first interlocking features and the outer surface of the roller holder bracket comprises second interlocking features configured to mate with the first interlocking features allowing movement of the roller holder bracket away from the surface of the movable barrier and preventing movement of the roller holder bracket toward the surface of the movable barrier. In some aspects, the method further comprises pivoting the roller holder bracket away from the movable barrier, such that the roller holder bracket rotates about the first end of the roller holder bracket and the first interlocking features of the inner surface of the support bracket and the second interlocking features of the outer surface of the roller holder bracket hold the roller holder bracket in place.

In another example aspect, the present disclosure is directed to a roller bracket assembly for a movable barrier having a surface. The roller bracket assembly may include: a first bracket configured to be coupled to the surface of the movable barrier, the first bracket comprising a first set of interlocking features. A second bracket may include a roller tube configured to receive a roller stem and a second set of interlocking features configured to mate with the first set of interlocking features of the first bracket.

In some aspects, the first set of interlocking features and the second set of interlocking features are configured to allow movement of the second bracket away from the surface of the movable barrier and prevent movement of the second bracket toward the surface of the movable barrier. In some aspects, the roller bracket assembly further comprises a third bracket couplable to the movable barrier. In some aspects, a first end of the second bracket is configured to be rotatably coupled to the third bracket. In some aspects, the roller bracket assembly further comprises a bias element positioned between the first bracket and the movable barrier causing the first surface of the first bracket to bear against the second surface of the second bracket.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
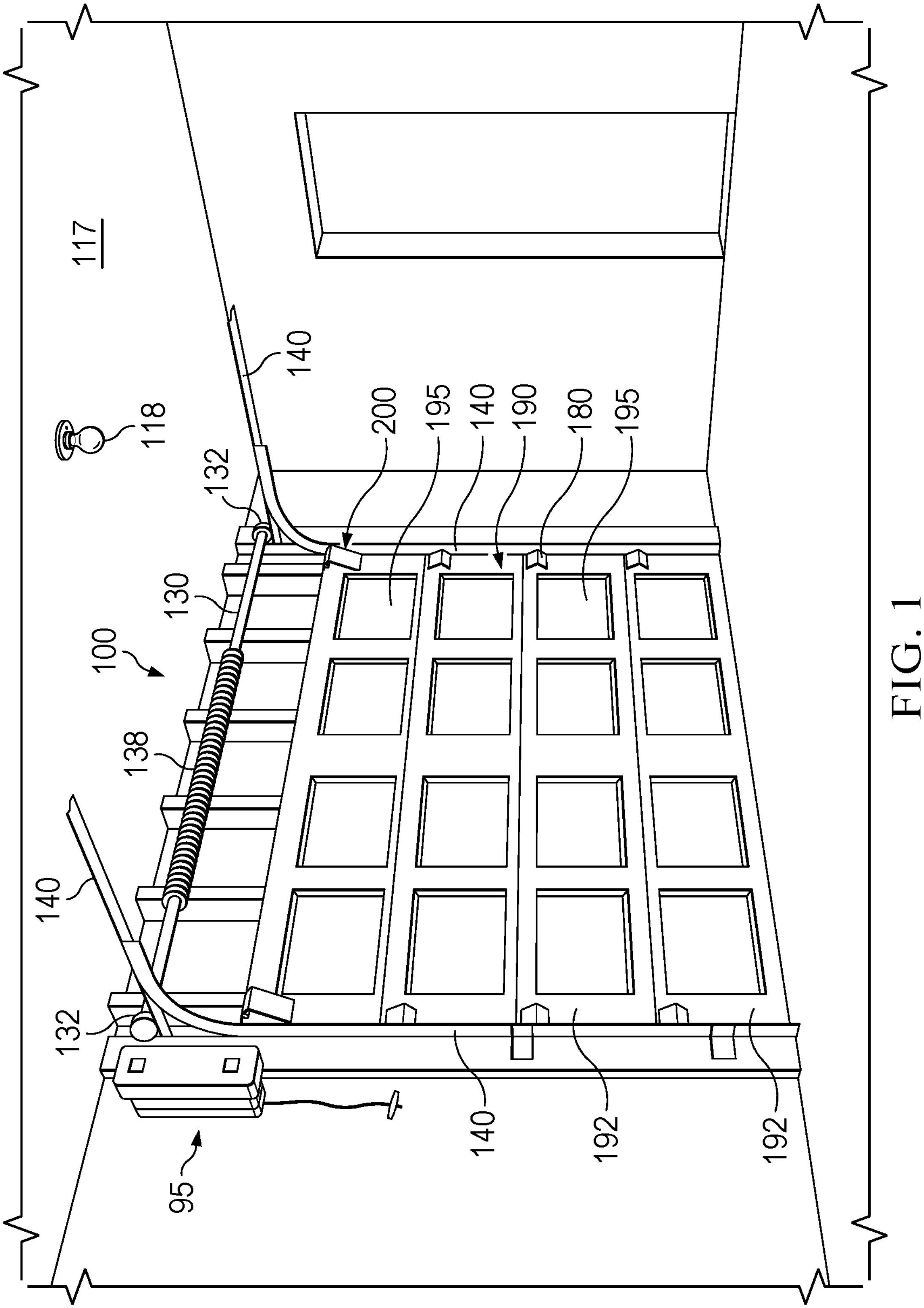
FIG. 1 is a perspective illustration of a movable barrier system, according to aspects of the present disclosure.

These Figures will be better understood by reference to the following detailed description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some aspects, the present disclosure relates to a top bracket assembly for a movable barrier. The top bracket assembly may be adjustable to space a roller at any number of different distances from the movable barrier. The top bracket assembly may include a base bracket, a roller holder bracket, and a support bracket. In some examples, the roller holder bracket may include one or more roller holders configured to receive the roller. During installation, the base bracket may be coupled to the movable barrier and the roller holder bracket may be rotatably coupled to the base bracket. The support bracket may be also coupled to the movable barrier. In the example herein, the roller holder bracket includes multiple ratcheting features along a surface of the roller holder bracket that engage corresponding ratcheting features of the support bracket. In this configuration, the ratcheting features may allow the roller holder bracket to be moved away from the movable barrier, but not toward the movable barrier. Because the ratcheting features of the support bracket and roller holder bracket prevent movement of the roller holder bracket toward the movable barrier, an installer of the top bracket assembly may position the roller holder bracket in its intended position relative to the support bracket, base bracket, and movable barrier with a single hand. For example, the installer may simply pull the roller holder bracket away from the movable barrier to the desired position. The ratcheting features may allow such movement and hold the roller holder bracket in the desired position by preventing it from moving back toward the movable barrier. With the brackets in this position, the installer has both hands free to install additional fasteners to finish the installation. As a result, the present disclosure may provide more efficient, and easy to use top bracket assembly for movable barriers. Additional aspects of the present disclosure will be described in more detail with reference to the Figures below.

FIG. 1 is a perspective illustration of an example movable barrier system 100, according to aspects of the present disclosure. In this example, the movable barrier is an upward acting garage door. In some examples, the movable barrier may be a sectional-type garage door. FIG. 1 illustrates a movable barrier 190 and a barrier operator 95. In some implementations, the movable barrier 190 may include multiple panels 192 and multiple panels 195. In some implementations, the panels 192 make up the movable barrier 190. For example, in FIG. 1, the movable barrier 190 may include four panels 192 arranged vertically. The panels 195 may be positioned within the panels 192 and may be transparent or non-transparent.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term. In some implementations, the light fixture 118 may be referred to as a light, a light system, or any other similar term.

FIG. 1 shows that the movable barrier 190 provides access to a space or a room having a ceiling 117 and the light fixture 118 that is spaced from the barrier operator 95. The movable barrier 190 may provide selective access to the space. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the same wall as the opening covered by the movable barrier 190. However, the barrier operator 95 may be positioned at any other location within the room shown in FIG. 1. For example, the barrier operator 95 may be affixed to the ceiling 117. In some implementations, the barrier operator 95 may be positioned on a different wall of the room or on the floor of the room. In some implementations, particularly in an implementation in which the barrier operator 95 is affixed or otherwise positioned on the ceiling 117 of the room, the light fixture 118 may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

FIG. 1 illustrates the movable barrier 190 as an upward acting sectional door being movable between open and closed positions along the tracks 140. The tracks 140 may be affixed to either side of the opening of the movable barrier 190. In some implementations, the tracks 140 may be affixed to the wall of the room shown in FIG. 1 and/or the ceiling 117. In some implementations, the movable barrier 190 may include one or more rolling or sliding components on either side sized and shaped to fit within and move in a longitudinal direction along the tracks 140. The rolling or sliding components may be affixed to the brackets positioned on either side of the movable barrier 190.

Components of the movable barrier system 100 shown in FIG. 1 may include any other suitable components. For example, the movable barrier system 100 may include rollers positioned on the movable barrier 190 or the tracks 140. The system 100 may include sensors, such as safety sensors configured to detect the presence or motion of an object or person, seals positioned along any portion of the movable barrier 190 or the corresponding opening, tracks, cables, or tube shafts. The system may include extension springs to further reduce necessary rotational force of a motor, a motor rail, belts, motor head, motor arms, lift handles for manual operation, emergency release ropes, or any other suitable components.

It is noted that the movable barrier 190 may include any number of sections (e.g., sections 192*a-d*), including a number of sections greater or less than those shown. Additionally, any of the sections 192*a-d* may include any number of roller brackets of various types. FIG. The movable barrier 190 may be a four-section barrier, such as the movable barrier 190 on a straight vertical track.

FIG. 1 additionally includes a view of multiple roller bracket assemblies 200. As will be described in more detail with reference to the following figures, the top bracket assembly may affix a top portion of the movable barrier 190 to the tracks 140 by one or more rollers.

Figure 2:
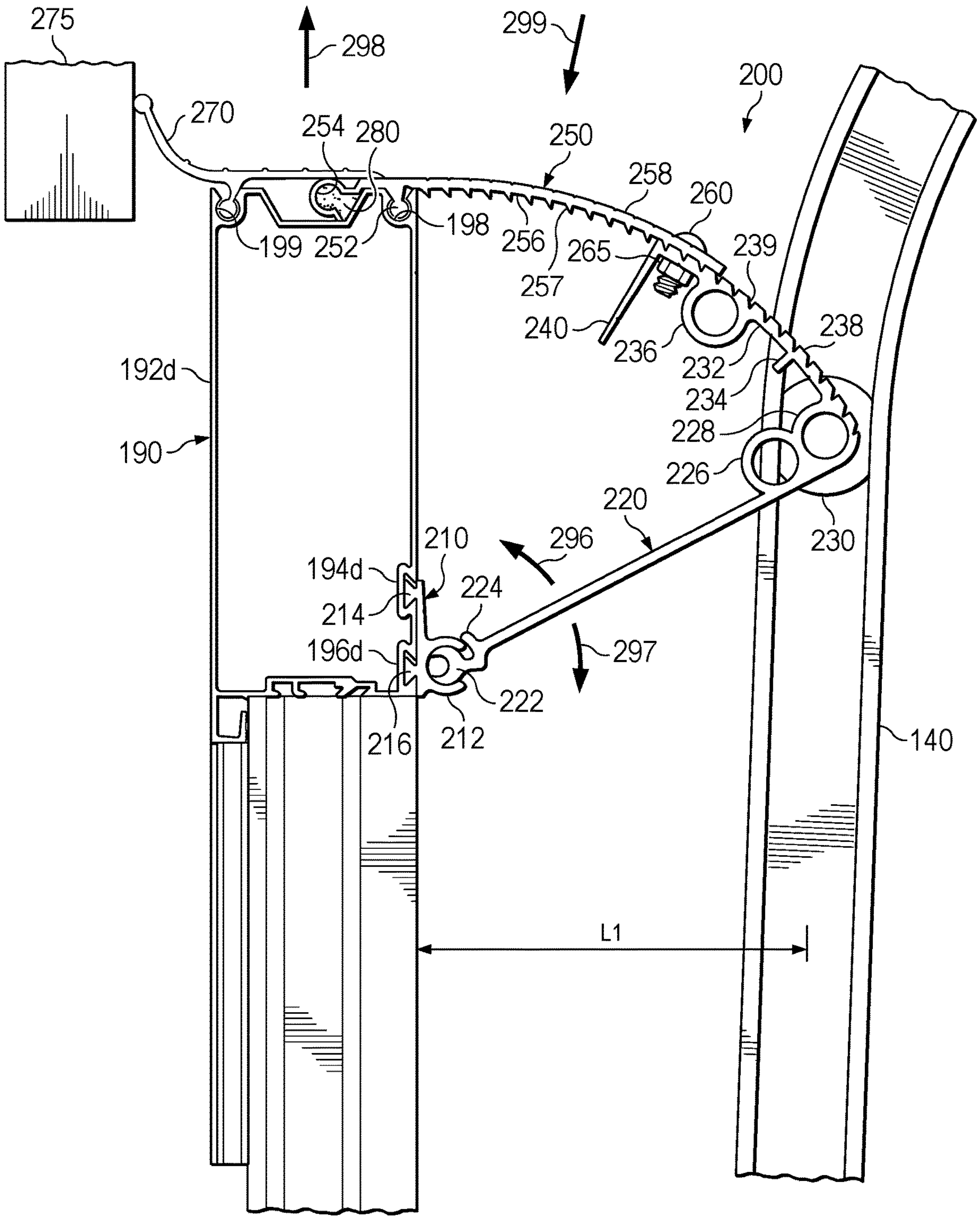
FIG. 2 is a side view of a movable barrier in a closed position along a track with a ratcheting bracket assembly, according to aspects of the present disclosure.

FIG. 2 is a side view of the movable barrier 190 in a closed position along a track 140 with a roller bracket assembly 200, according to aspects of the present disclosure. The roller bracket assembly 200 may additionally be referred to as a top bracket assembly, a ratcheting bracket assembly, or by any other suitable term. Aspects of the roller bracket assembly 200 will be described hereafter with reference to steps of an installation procedure. The installation procedure includes a number of steps, but aspects of the installation procedure may include additional steps before, after, or in between the steps described herein. In some aspects, one or more of the steps described may be omitted, performed in a different order, or performed concurrently.

During an installation of the movable barrier 190, the movable barrier 190 may be affixed to the tracks 140 by multiple roller holder brackets and corresponding rollers. For example, referring to FIG. 1, each panel 192 except the top panel 192*d* may include two roller holder brackets 180 positioned at either end of the panel 192. Each of these roller holder brackets 180 may retain a stem of a roller while a head of the roller holder is positioned within one of the tracks 140. The roller holder brackets are configured to space the rollers from the inner surface of the movable barrier 190 by different distances creating an angle between the movable barrier 190 in a vertical position and the tracks 140. In that regard, the roller holder bracket 180 positioned at the lowest panel 192 may space corresponding rollers from the surface of the movable barrier 190 by a minimum amount and brackets at higher vertical positions space rollers by an increasing amount to maintain the angle between the movable barrier 190 and the tracks 140.

Similarly, as shown in FIG. 2, the roller bracket assembly 200 may space the roller 230 from the inner surface of the panel 192*d* by a distance greater than the spaced distance created by the roller holder brackets 180. However, due to variations in the positioning of the track 140, the height of the movable barrier 190, or any other variations in dimensions of the movable barrier system 100, the top bracket assembly may need to be adjustable such that the roller 230 shown in FIG. 2 may be spaced from the inner surface of the panel 192*d* by a variety of distances.

Installation of conventional adjustable top bracket assemblies may present several difficulties. For example, an installer of an adjustable top bracket assembly typically must hold the bracket assembly in the desired position while pushing the movable barrier against the wall and securing the assembly in place, e.g., by a fastener. This procedure is typically done at height, so an installer must also typically hold on to a ladder during installation.

Aspects of the roller bracket assembly 200 eases the installation process of a top bracket assembly, increasing efficiency and safety. As shown in FIG. 2, the roller bracket assembly 200 may include a base bracket 210, a roller holder bracket 220, and a support bracket 250.

At one step of the installation process, the base bracket 210 may be affixed to an inner surface of the movable barrier 190. FIG. 2 includes a side view of the top panel 192*d* of the panels 192 described with reference to FIG. 1. In that regard, the inner surface of the top panel 192*d* may include a groove 194*d* and a groove 196*d*. In some examples, the grooves 194*d* and 196*d* may extend across the top panel 192*d* parallel to a top edge of the top panel 192*d*. The base bracket 210 may include a protrusion 214 and a protrusion 216. The cross-sectional shapes of the protrusions 214 and 216 may correspond to the cross-sectional shapes of the grooves 194*d* and 196*d*. In that regard, the base bracket 210 may be slid from a side of the movable barrier 190 into and along the grooves 194*d* and 196*d*. The base bracket 210 may be slidably coupled to the inner surface of the movable barrier 190.

In some aspects, the base bracket 210 may be affixed to the movable barrier 190 in any suitable way. For example, the base bracket 210 may be secured to the movable barrier 190 with a fastener, such as a screw, or nut and bolt. In some aspects, the protrusions 214 and 216 of the base bracket 210 may be positioned within the grooves 194*d* and 196*d*. In this configuration, the base bracket 210 may slide in a direction parallel to the upper edge of the movable barrier 190. The dovetail protrusions 214 and 216 and corresponding grooves 194*d* and 196*d* may prevent the base bracket 210 from being removed from the movable barrier 190 in a direction perpendicular from the movable barrier 190. After the base bracket 210 is positioned at a desirable location along the grooves 194*d* and 196*d*, the bracket 210 may be further affixed to the surface of the movable barrier 190, for example, by a fastener extending through the base bracket 210 and into the movable barrier 190. In some aspects, the base bracket 210 may include an opening (e.g., the hole 217 shown and described with reference to FIG. 3B) configured to receive such a fastener.

The base bracket 210 additionally includes a socket 212. The socket 212 may include a substantially cylindrical shaped cavity with an opening extending outwardly from the base bracket 210. In that regard, the socket may be sized and shaped to receive a corresponding pivot head. For example, the pivot head 222 of the roller holder bracket may be positioned within the socket 212. In this way, the socket 212 and the pivot head 222 may form a joint. In some aspects, the socket 212 of the base bracket 210 may be positioned at any suitable location on the base bracket 210. For example, although the socket 212 is shown at a lower portion of the base bracket 210, the socket 212 may be positioned at an intermediate portion, and upper portion, and upper edge, or a lower edge of the base bracket 210. In some aspects, a socket, like the socket 212 described, may alternatively be positioned on the roller holder bracket 220 and a corresponding pivot head (like the pivot head 222) may be positioned on the base bracket 210. In addition, an suitable type of joint may be used to rotatably affix an end of the roller holder bracket 220 to the base bracket 210. In some aspects, the base bracket 210 may additionally be referred to as a base.

The roller holder bracket 220 shown in FIG. 2 may be rotatably affixed to the base bracket 210. For example, as described above, the roller holder bracket 220 may include the pivot head 222. The pivot head 222 may be positioned within the socket 212 of the base bracket 210 during an installation of the roller bracket assembly 200. In some aspects, the pivot head 222 may be slid from a side of the base bracket 210 into the cavity of the socket 212. In such a configuration, the wall extending from the pivot head 222 may be positioned within the opening of the socket 212. The opening of the socket 212 may allow the roller holder bracket 220 to rotate about the socket 212.

In some aspects, the roller holder bracket 220 may additionally include a protrusion 224 extending inwardly toward the movable barrier 190 such that a gap is created between the pivot head 222 and the protrusion 224. As shown in FIG. 2, an upper wall of the socket 212 may be received within the gap between the pivot head 222 and the protrusion 224. In that regard, when the roller holder bracket 220 is in a collapsed position (e.g., when the wall 240 of the roller holder bracket 220 contacts the inner surface of the panel 192*d*) and when the pivot head 222 is positioned within the socket 212, the upper wall of the socket 212 may fill the gap between the pivot head 222 and the protrusion 224.

At one step of an installation procedure, the support bracket 250 may be affixed to a top surface of the movable barrier 190. For example, the panel 192*d* may include two grooves 198 and 199 along the top edge of the panel 192*d*. As shown in FIG. 2, the grooves 198 and/or 199 may be configured to receive protrusions of a seal 270. In that regard, the seal 270 may extend along the entire length of the upper edge of the panel 192*d*. As shown, one protrusion may be positioned within the groove 199 along an outer side of the top surface of the panel 192*d* and a similar protrusion may be positioned within the groove 198 along an inner side of the top surface of the panel 192*d*. A portion of this seal 270 may extend outward from the top of the panel 192*d* and contact a structure 275. In some aspects, the structure 275 may be a portion of a wall. In some aspects, the structure 275 may be a portion of a wall defining an upper edge of an opening in the wall, the movable barrier 190 configured to provide selective access to a room through the opening of the wall.

The support bracket 250 may include a protrusion 252. In some aspects, the protrusion 252 may alternatively be referred to as a pivot head. The protrusion 252 may be positioned within the inner side groove 198 as shown in FIG. 2. In this way, the support bracket 250 may be rotatably affixed to the top surface of the movable barrier 190. For example, the protrusion 252 and groove 198 may form a pivot or joint which allows the support bracket 250 to rotate about the groove 198. In the example shown, the protrusion includes a bulbous head that may be introduced into the inner side groove 198, but may resist removal except under certain loads. Furthermore, the protrusion need not pivot in some examples.

At another step of the installation procedure of the roller bracket assembly 200, the head of the roller 230 may be positioned within the track 140.

At another step of the installation procedure of the roller bracket assembly 200, the roller holder bracket 220 may be positioned such that the pivot head 222 of the roller holder bracket 220 is positioned within the cavity of the socket 212, the stem of the roller 230 is positioned within one of the roller holders 226, 228, or 236 of the roller holder bracket 220, ratcheting features of the outer surface 238 engage with corresponding ratcheting features of the inner surface 256 of the support bracket 250 (described hereafter), and the wall 240 contacts an inner surface of the panel 192*d*. In some aspects, a configuration of the ratcheting bracket assembly at this stage of installation may be similar to that shown in FIG. 4.

At another step of the installation procedure, the roller holder bracket 220 may be pivoted away from the panel 192*d*. In some aspects, this step may include pulling the roller holder bracket away from the panel 192*d* or pushing the panel 192*d* toward the structure 275. In this way, the wall 240 of the roller holder bracket 220 may be spaced from the inner surface of the panel 192*d*. In this position, ratcheting features of the support bracket 250 and the roller holder bracket 220 may retain the position of the roller holder bracket 220 spaced from the panel 192*d*, freeing up the installer's hands to affix any of the brackets in place, as described below.

The support bracket 250 includes an inner surface 256 and an outer surface 258. In some aspects, the inner surface 256 of the support bracket 250 may include multiple ratchet protrusions 257 extending inwardly from the inner surface 256. In some aspects, the ratchet protrusions 257 may alternatively be referred to as teeth. The roller holder bracket 220 includes an outer surface 238 and an inner surface 232. The outer surface 238 may include multiple ratchet grooves 239 along the outer surface 238. In some examples, the ratchet grooves are formed between ratchet protrusions or teeth. The cross-sectional shape of the ratchet grooves 239 may correspond to the cross-sectional shape of the ratchet protrusions 257.

Due to the corresponding cross-sectional shapes of the ratchet protrusions 257 and the ratchet grooves 239, the ratchet protrusions 257 may engage with the ratchet grooves 239 to hold the position of the roller holder bracket 220 in place during installation of the roller bracket assembly 200. For example, the angled nature of the ratchet protrusions 257 and the ratchet grooves 239 allow the outer surface 238 to slide along the inner surface 256 in the direction 297 away from the panel 192*d*. As the outer surface 238 slides along the inner surface 256, the ratchet protrusions 257 consecutively click or snap into the ratchet grooves 239 such that the ratchet protrusions 257 and ratchet grooves 239 rapidly engage and disengage due to the slight compliant nature of the metal, polymer, or other material of which the support bracket 250 and the roller holder bracket 220 are formed. When the roller holder bracket 220 is positioned at the desired location (e.g., with the roller 230 spaced from the panel 192 by a distance L1), the ratchet protrusions 257 may engage the ratchet grooves 239 preventing movement of the roller holder bracket 220 in the direction 296.

It is noted that in some aspects, the support bracket 250 may include ratchet grooves along the inner surface 256 and the outer surface 238 of the roller holder bracket 220 may include corresponding ratchet protrusions. In addition, any other ratcheting features may be disposed on the inner surface 256 and the outer surface 238 to allow movement of the roller holder bracket 220 in the direction 297 and prevent movement of the roller holder bracket 220 in the direction 296.

To ensure that the ratchet protrusions 257 and ratchet grooves 239 do not unintentionally fall out of engagement during an installation procedure, the inner surface 256 of the support bracket 250 may be urged in the direction 299 to bear against the outer surface 238 of the roller holder bracket 220. This bearing force may be provided in any suitable way.

In some aspects, a biasing mechanism or bias element may be included in the roller bracket assembly 200 which provides this bearing force. For example, the support bracket 250 may include a groove 254 at one end. The groove 254 may receive an elastic material 280. The elastic material 280 may include any suitable type of elastic material and may be sized and shaped corresponding to the groove 254. The elastic material 280 may contact an upper surface of the panel 192*d* and the inner surface of the groove 254. In some aspects, the elastic material 280 may first be positioned within the groove 254 and may be deformed during installation of the support bracket 250 to allow the protrusion 252 to be positioned within the groove 198. In this way, in an installed position, the elastic material 280 tightly bears against the upper surface of the panel 192*d* and the inner surface of the groove 254 creating an upward acting force on the support bracket 250 in the direction 298. Because the support bracket 250 acts as a pivot about the protrusion 252, this upward acting force may be create a downward acting force on a side of the support bracket 250 opposite the elastic material 280. This force is shown in the direction 299. This downward acting force causes the inner surface 256 to bear against the outer surface 238 preventing the ratcheting protrusions 257 from inadvertently disengaging the ratcheting grooves 239.

Any suitable form of biasing may be used to cause the inner surface 256 to bear against the outer surface 238. For example, an alternative bias element 380 is shown and described with reference to FIGS. 3A and 3B. In some aspects, a spring may be positioned between an inner surface of the support bracket 250 and the top surface of the panel 192*d*. This spring may create a similar upward acting force in the direction 298.

With the roller holder bracket 220 held in place by the ratchet protrusions 257 and grooves 239, an installer of the roller bracket assembly 200 may affix the support bracket 250 to the roller holder bracket 220. For example, a fastener, such as the bolt 260 shown in FIG. 2, may couple the support bracket 250 to the roller holder bracket 220. In some aspects, the fastener may include a self-tapping fastener which may be driven through the support bracket 250 and into the roller holder bracket 220 securing the roller holder bracket 220 in place.

An additional step of installation may include fastening any of the other brackets or components of the roller bracket assembly 200. For example, a fastener may be driven through the base bracket 210 coupling the base bracket 210 to the panel 192*d*. In this way, the base bracket 210 may no longer slide along the grooves 194*d* and 196*d*. Similarly, a fastener may be driven through the support bracket 250 into the panel 192*d* also preventing the support bracket 250 from sliding along the groove 198.

As shown in FIG. 2, the pivot head 222 may include a cavity. The cavity of the pivot head may be of a circular cross-sectional shape and may extend all along the length of the pivot head 222. In some aspects, the cavity may not extend all along the length of the pivot head 222, but may be present in only one side of the pivot head 222. In some aspects, a fastener, such as a screw or bolt, may be driven within the cavity of the pivot head 222. In this way, threads of the fastener may engage the pivot head as well as the inner surface of the socket 212 and may couple the pivot head 222 to the socket 212. The positioning of such a fastener in this way may prevent motion of the roller holder bracket 220 about the socket 212, increasing the strength of the ratcheting bracket assembly after installation.

As mentioned previously, the roller holder bracket 220 may include multiple roller holders. In some aspects, the multiple roller holders include the roller holder 226, the roller holder 228, and the roller holder 236. The positioning of these roller holders 226, 228, and 236 may be selected to maximize the range of distances the bracket assembly may space the roller 230 from the movable barrier 190. For example, if the roller 230 needs to be spaced a small distance from the movable barrier 190, the roller 230 may be positioned within the roller holder 236 and the roller holder bracket 220 may be positioned close to the panel 192*d*. If the roller 230 needs to be spaced a larger distance from the panel

192*d*, the roller 230 may be positioned within the roller holder 228 and/or 226 and the roller holder bracket 220 may be rotated to a location farther from the panel 192*d*.

In some aspects, the roller holder 226 may be included as an element of the roller holder bracket 220 to increase the adjustability of the bracket assembly. In some aspects, as will be discussed in more detail with reference to FIGS. 5-6, the roller holder 226 may provide an additional location a different distance from the movable barrier when the wall 240 of the roller holder bracket 220 is affixed directly to the movable barrier 190 (e.g., without the use of the support bracket 250).

Any of the fasteners described herein may be any suitable type of fastener, including self-tapping screws. In that regard, a self-tapping screw may be used to fasten the support bracket 250 to the roller holder bracket 220. For example, a self-tapping screw may extend through the support bracket 250 and into the roller holder bracket 220 or vice versa.

FIG. 2 illustrates an additional aspect in which a bolt 260 is positioned within a hole of the support bracket 250 and an aligned hole of the roller holder bracket 220. A nut 265 is shown engaging with the threads of the bolt 260 coupling the supporting bracket 250 to the roller holder bracket 220. In some aspects, a self-tapping screw may first be used to couple the support bracket 250 and the roller holder bracket 220. However, in the event of stripping of the threads of the screw or holes of the brackets, a bolt 260 and nut 265 may be used.

As shown in FIG. 2, the nut 265 may be positioned within a channel on the inner surface 232 of the roller holder bracket 220 formed by the wall 240 and the roller holder 236. In some aspects, the width of this channel (e.g., the distance between the wall 240 and the roller holder 236) may correspond to a width of the nut 265. In this way, when the nut 265 is positioned within the channel, the wall 240 and roller holder 236 prevent the nut 265 from rotating. As a result, an installer of the roller bracket assembly 200 may drive the bolt 260 to engage with the nut 265 without needing to simultaneously hold the nut 265 stationary.

The inner surface 232 of the roller holder bracket 220 also includes a wall 234. The wall 234 may be positioned between the roller holder 236 and the roller holder 228, forming two channels. The width of these channels may be the same as the width of the channel formed by the wall 240 and the roller holder 236. As a result, the nut 265 may similarly be positioned within either of these channels corresponding to the wall 234 such that these channels prevent rotation of the nut 265 during installation. In some regards, the nut 265 may be positioned within these two additional channels when the roller holder bracket 220 is rotated closer to the panel 192*d*, e.g., when the support bracket 250 overlaps with regions of the roller holder bracket 220 corresponding to the channels.

Figure 3A:
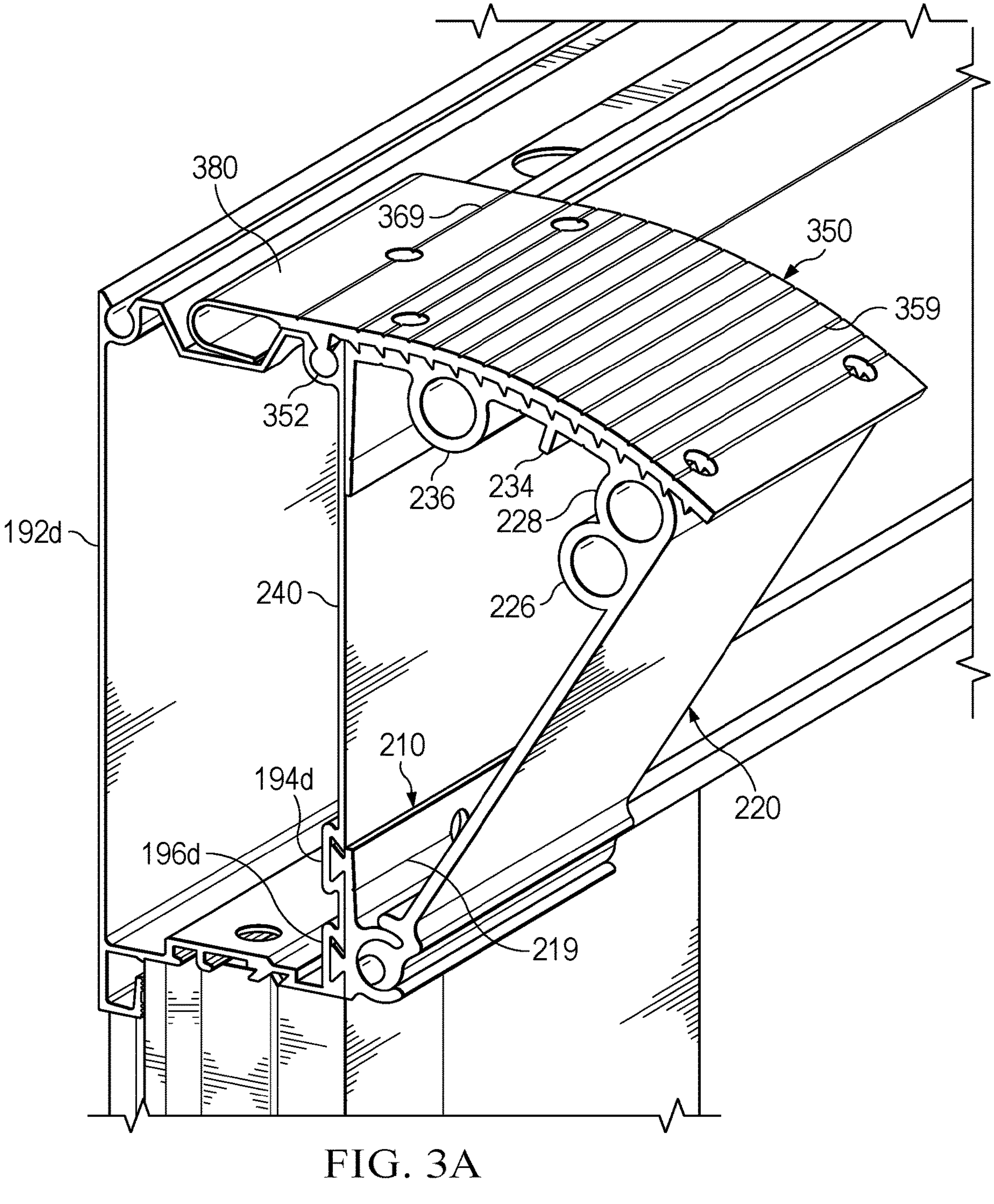
FIG. 3A is a perspective view of a ratcheting bracket assembly in a collapsed orientation, according to aspects of the present disclosure.

FIG. 3A is a perspective view of a ratcheting bracket assembly in a collapsed orientation, according to aspects of the present disclosure. As shown, FIG. 3A illustrates the roller holder bracket 220 and the base bracket 210 as well as a support bracket 350.

The collapsed orientation of the ratcheting bracket assembly shown may refer to an orientation in which the wall 240 contacts the panel 192*d*, as shown. In some aspects, the installer may position the ratcheting bracket assembly in a collapsed position as shown in FIG. 3A prior to expanding the assembly by pulling the roller holder bracket 220 outward and/or pushing the panel 192*d* in an opposite direction.

The support bracket 350 shown in FIG. 3A may be similar to the support bracket 250 shown and described with reference to FIG. 2. For example, the support bracket 350 includes ratchet protrusions along an inner surface, a protrusion 352 configured to be received within the corresponding groove of the movable barrier, and a bias element 380.

In some aspects, the bias element 380 may similarly provide an upward force (e.g., the force in the direction 298 of FIG. 2) and a corresponding downward force (e.g., the force in the direction 299 of FIG. 2) preventing the ratchet protrusions of the support bracket 350 from disengaging the ratchet grooves of the roller holder bracket 220. To provide this force, the bias element 380 may include a curved structure of a thickness selected to maximize flexible resistance of the curved structure. For example, the thickness of the curved structure may be less than the rest of the support bracket 350 as shown. The end of the curved structure may contact the upper surface of the movable barrier. In this configuration, as the end of the curved structure bears against the upper surface of the movable barrier 190, the curved region of the bias element 380 may flex, and resist deformation. This resistance creates a force in the direction 298 (FIG. 2) and a corresponding downward force in the direction 299 (FIG. 2).

As additionally shown in FIG. 3A, the outer surface of the support bracket 350 may include multiple grooves 359. As shown, the grooves 359 may extend across the upper surface of the support bracket 350. In some aspects, the grooves 359 may extend in a direction parallel to the movable barrier 190. The grooves 359 may alternatively extend in any other direction along the upper surface of the support bracket 350. The grooves 359 may provide multiple locations for fasteners during an installation of the bracket assembly. For example, a tip of a self-tapping screw may be positioned within any of the grooves 359 during installation. As the screw is driven through the support bracket 350 and the roller holder bracket 220, the grooves 359 may prevent the tip of the self-tapping screw from moving along with the outer surface of the support bracket 350. In some aspects, the tip of a drill bit may similarly be positioned within any of the grooves 359 to prevent the drill bit from moving along the outer surface of the support bracket 350.

A similar groove 369 is also shown within the support bracket 350. The groove 369 may be positioned on the other side of the protrusion 352 of the support bracket 350. The groove 369 may be configured to receive or guide a self-tapping screw, or other fastener, or a drill bit when the support bracket 350 is coupled to the top surface of the panel 192*d* during installation as described previously. In addition, the groove 369 may indicate the ideal position for a fastener securing the support bracket 350 to the panel 192*d*. For example, the groove 369 may assist an installer to not unintentionally secure a fastener through portions of the bias element 380 and/or the protrusion 352.

FIG. 3A additionally shows a groove 219 within the base bracket 210. Like the grooves 359 and 369, the groove 219 may prevent movement of a self-tapping screw, other fastener, or drill bit as it is driven through the base bracket 210. Like the groove 369, the groove 219 may additionally indicate the ideal location for a fastener securing the base bracket 210 to the panel 192*d* so as to avoid portions of the grooves 194*d* or 196*d* or corresponding protrusions of the base bracket 210. In some aspects, a fastener may be driven through the base bracket 210 securing the base bracket 210 to the panel 192*d* before installation of the roller holder bracket 220 to provide access to the fastener during installation.

Figure 3B:
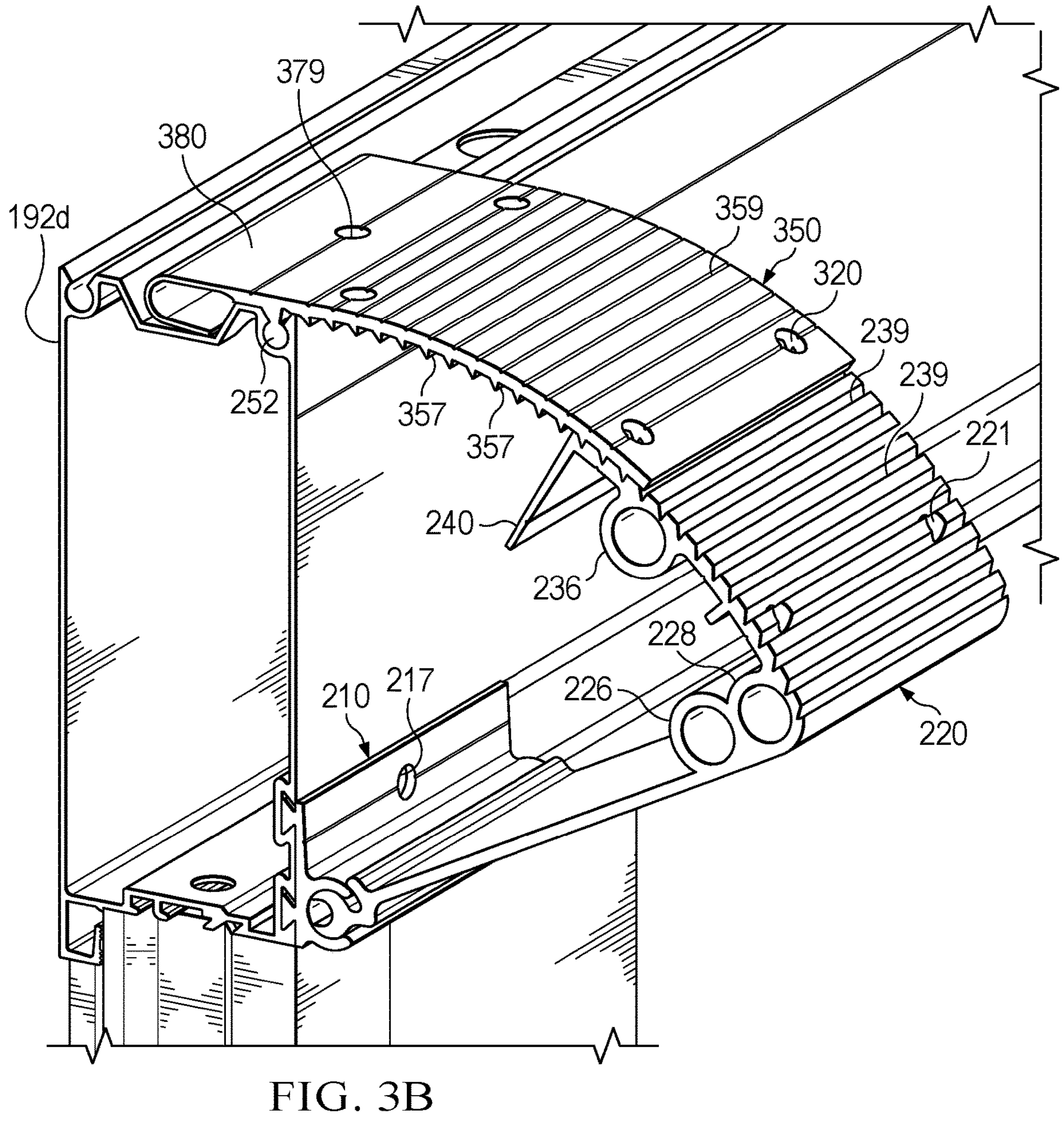
FIG. 3B is a perspective view of a ratcheting bracket assembly in an expanded orientation, according to aspects of the present disclosure.

FIG. 3B is a perspective view of a ratcheting bracket assembly in an expanded orientation, according to aspects of the present disclosure. Like FIG. 3A, FIG. 3B illustrates the roller holder bracket 220 and the base bracket 210 as well as the support bracket 350.

The orientation shown in FIG. 3B may correspond to an orientation of a ratcheting bracket assembly after the base bracket 210, the roller holder bracket 220, and the support bracket 350 have been installed. The orientation shown may also correspond to an orientation of the ratcheting bracket assembly after an installer of the ratcheting bracket assembly has pulled the roller holder bracket 220 and the panel 192*d* in opposite directions. FIG. 3B also identifies ratchet protrusions 357 of the support bracket 350 as well as the ratchet grooves through 239 described previously. Based on the cross-sectional shape of the ratchet protrusions 357 and the ratchet grooves 239, these ratcheting features allow movement of the roller holder bracket 220 away from the panel 192*d* but prevent movement of the roller holder bracket 220 toward the panel 192*d*. In that regard, the orientation of the bracket assembly shown in FIG. 3B may correspond to an orientation prior to installation of fasteners securing the support bracket 350 to the panel 192*d* and the roller holder bracket 220, as well as the roller holder bracket 220 to the base bracket 210, and the base bracket 210 to the panel 192*d*.

FIG. 3B additionally shows multiple holes 320 extending through the support bracket 350. In some aspects, these holes 320 may be pre-drilled holes configured to receive a fastener, such as a bolt (e.g., the bolt 260 described with reference to FIG. 2) or screw. These holes 320 may be positioned at any suitable location along the support bracket 350. In some aspects, an installer of the bracket assembly may create the holes 320.

FIG. 3B also depicts multiple holes 221 positioned within the roller holder bracket 220. In some aspects, the holes 221 may be configured to be aligned with the holes 320 in an expanded orientation.

FIG. 3B additionally shows a hole 379. The hole 379 may be aligned with the groove 369 described with reference to FIG. 3A. Similarly, the hole 379 may be configured to receive a fastener, such as the bolt or screw.

FIG. 3B additionally shows a hole 317. The hole 217 may be aligned with the groove 219 described with reference to FIG. 3A. similarly, the hole 379 may be configured to receive a fastener, such as a bolt or screw.

Figure 4:
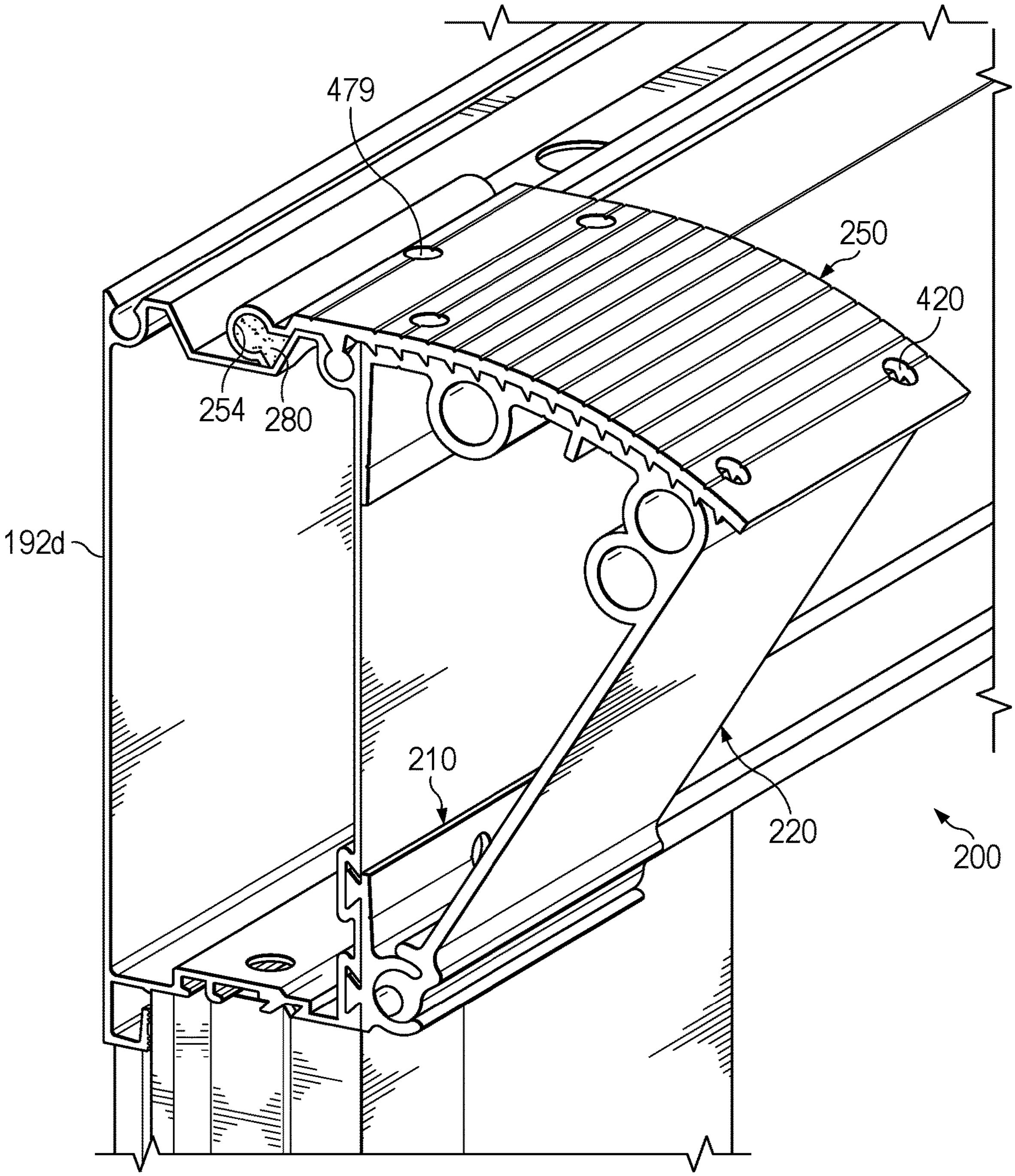
FIG. 4 is a perspective view of a ratcheting bracket assembly in a collapsed orientation, according to aspects of the present disclosure.

FIG. 4 is a perspective view of the roller bracket assembly 200 in a collapsed orientation, according to aspects of the present disclosure. FIG. 4 may illustrate additional elements of the roller bracket assembly 200 as shown in the perspective view.

For example, the support bracket 250 may include grooves similar to the grooves 359 and 369 described with reference to FIG. 3A previously. In addition, the support bracket 250 may include holes 420 similar to the holes 320 described with reference to FIG. 3B.

The collapsed orientation shown in FIG. 4 may correspond to an orientation of the ratcheting bracket assembly prior to an installer moving the roller holder bracket 220 and the panel 192*d* away from my each other during installation. In other aspects, the collapsed orientation shown in FIG. 4 may correspond to a final orientation of the ratcheting bracket assembly. For example, the ratcheting bracket assembly may be retained and installed in a collapsed configuration depending on the desired distance of the roller from the inner surface of the panel 192*d*.

Figure 5:
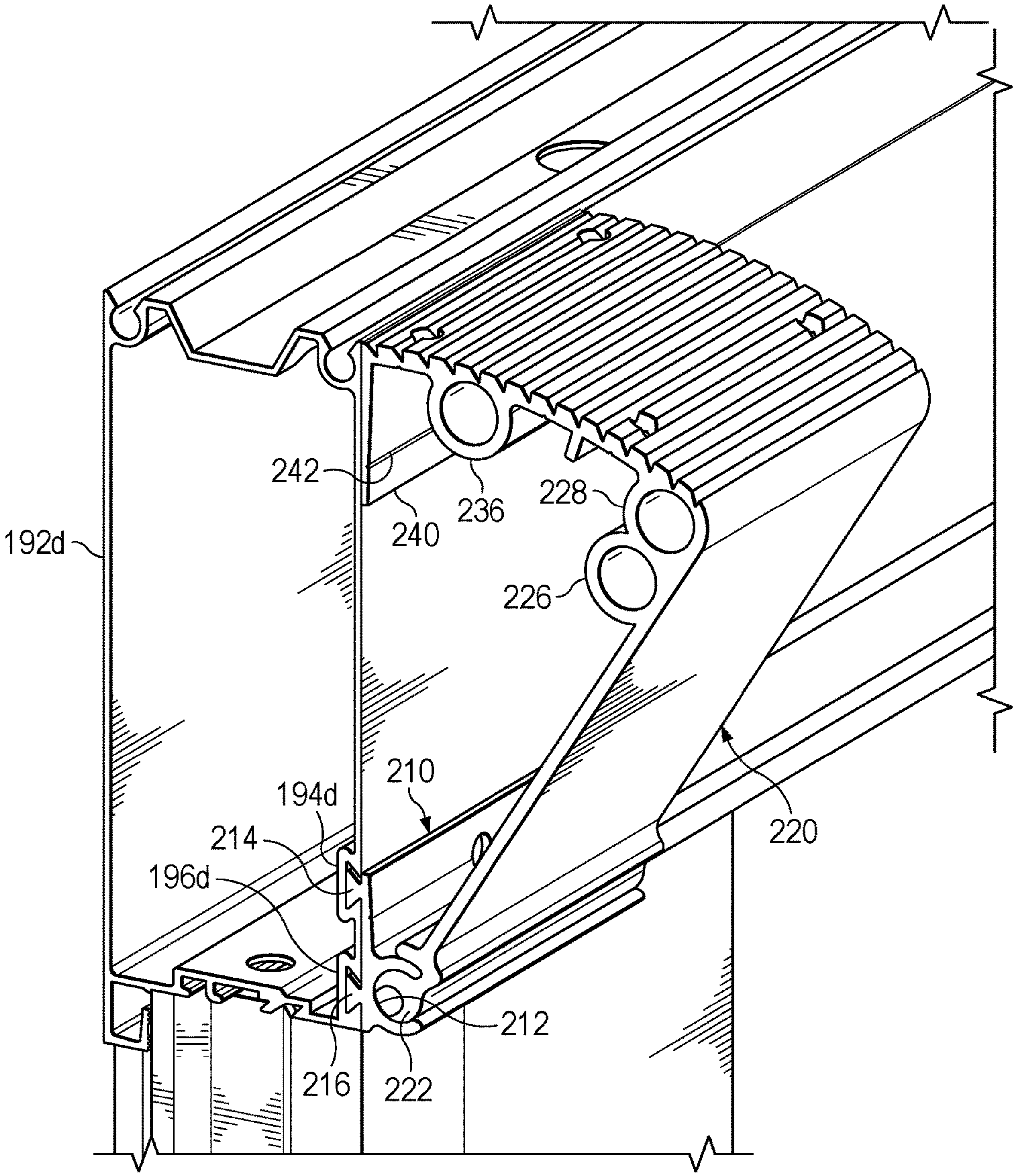
FIG. 5 is a perspective view of a bracket assembly in a fixed orientation, according to aspects of the present disclosure.

FIG. 5 is a perspective view of a bracket assembly in a fixed orientation, according to aspects of the present disclosure. FIG. 5 includes a view of the base bracket 210 and the roller holder bracket 220.

In some aspects, the desired distance between the inner surface of the panel 192*d* and the roller may correspond to a distance between any of the roller holders 226, 228, or 236 and the wall 240. In this way, the roller holder bracket 220 may not need to be rotated away from the inner surface of the panel 192*d* as shown in FIGS. 2, 3A, and 3B. In this case, a support bracket (e.g., the support bracket 250 or the support bracket 350) may not be needed. Rather, the wall 240 may contact the inner surface of the panel 192*d*. In this orientation, a fastener may couple the wall 240 to the panel 192*d*.

To facilitate the installation of a fastener affixing the roller holder bracket 220 to the panel 192*d*, a groove 242 may be included as shown within the wall 240. This groove 242 may be similar to the grooves 359, 369, or 219 previously described. For example, a groove 242 may help to prevent movement of the tip of a self-tapping screw or drill bit as it is driven through the wall 240 and into the panel 192*d*.

In some aspects, the base bracket 210 and the roller holder bracket 220 in the orientation shown may be installed at a top portion of the movable barrier 190. For example, the arrangement shown, including the wall 240 being secured directly to the panel 192*d* and without a support bracket, may replace any of the ratcheting bracket assemblies described previously.

In some aspects, the orientation of the base bracket 210 and the roller holder bracket 220 shown in FIG. 5 may be implemented at any other location along the movable barrier 190. For example, the configuration shown and FIG. 5 may serve as a replacement to any of the roller holder brackets 180 described with reference to FIG. 1.

Figure 6:
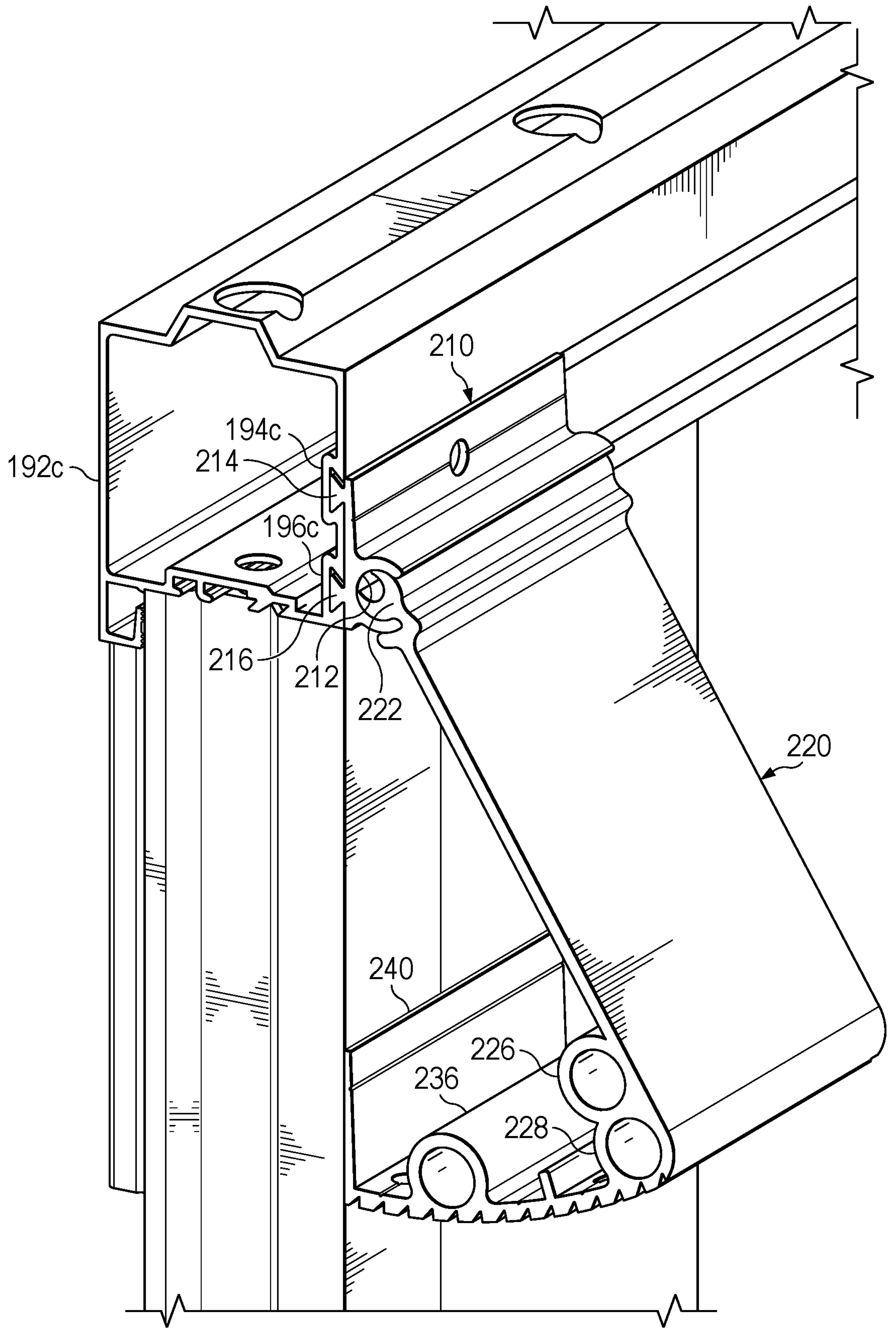
FIG. 6 is a perspective view of a bracket assembly in a fixed orientation, according to aspects of the present disclosure.

FIG. 6 is a perspective view of a bracket assembly in a fixed orientation, according to aspects of the present disclosure. FIG. 6 includes a view of the base bracket 210 and the roller holder bracket 220 in an additional orientation.

In the example shown in FIG. 6, the base bracket 210 may be affixed to a different panel 192*c*. For example, the panel 192*c* may be a panel 192 of the movable barrier 190 which is below the top panel 192*d*. In this way, the bracket assembly shown in FIG. 6 may not be a top bracket assembly, but may replace any of the roller holder brackets 180 shown and described with reference to FIG. 1. In the orientation shown, the protrusions 214 and 216 of the base bracket 210 may be positioned within corresponding grooves 194*c* and 196*c* of the panel 192*c*. In some aspects, the grooves 194*c* and 196*c* may include any characteristics or features described with reference to the grooves 194*d* and 196*d* previously.

The pivot head 222 of the roller holder bracket 220 may again be positioned within the cavity of the socket 212. However, in the orientation shown in FIG. 6, the base bracket 210 may be positioned vertically upward of the roller holder bracket 220. In this way, the wall 240 may be affixed to a surface of the panel 192*c* at a lower location then the base bracket 210.

The orientation shown and described in FIG. 6 may additionally correspond to a situation in which the desired distance from the inner surface of the panel 192*c* to the roller corresponds to a distance from any of the roller holders 226, 228, or 236 to the wall 240.

In some aspects, the bracket assembly of the configuration shown in FIG. 6 may serve as a substitute for the roller holder brackets 180 of FIG. 1. For example, the roller holder brackets 180 of FIG. 1 may be configured to retain and space rollers at specified distances from the inner surface of the movable barrier 190 for the first three lowest panels. In the configuration shown in FIG. 1, the roller holder brackets 180 may then be suitable to affix the lowest three panels 192 of the movable barrier 190 to the tracks 140 and the top bracket may include any of the ratcheting bracket assemblies described herein. However, for movable barriers including panels in excess of the panels 192 shown in FIG. 1, additional brackets may be needed. In an aspect in which the roller holder brackets 180 are used for the lowest three panels 192 and the ratcheting bracket assembly is used for the top panel, if, for example, an additional, fifth panel 192 is positioned between the top panel and the bottom three panels 192, the bracket assembly in the configuration shown in FIG. 6 may serve as a bracket for retaining the roller and fixing the movable barrier to the tracks 140 for this or any other additional panels.

Figure 7A:
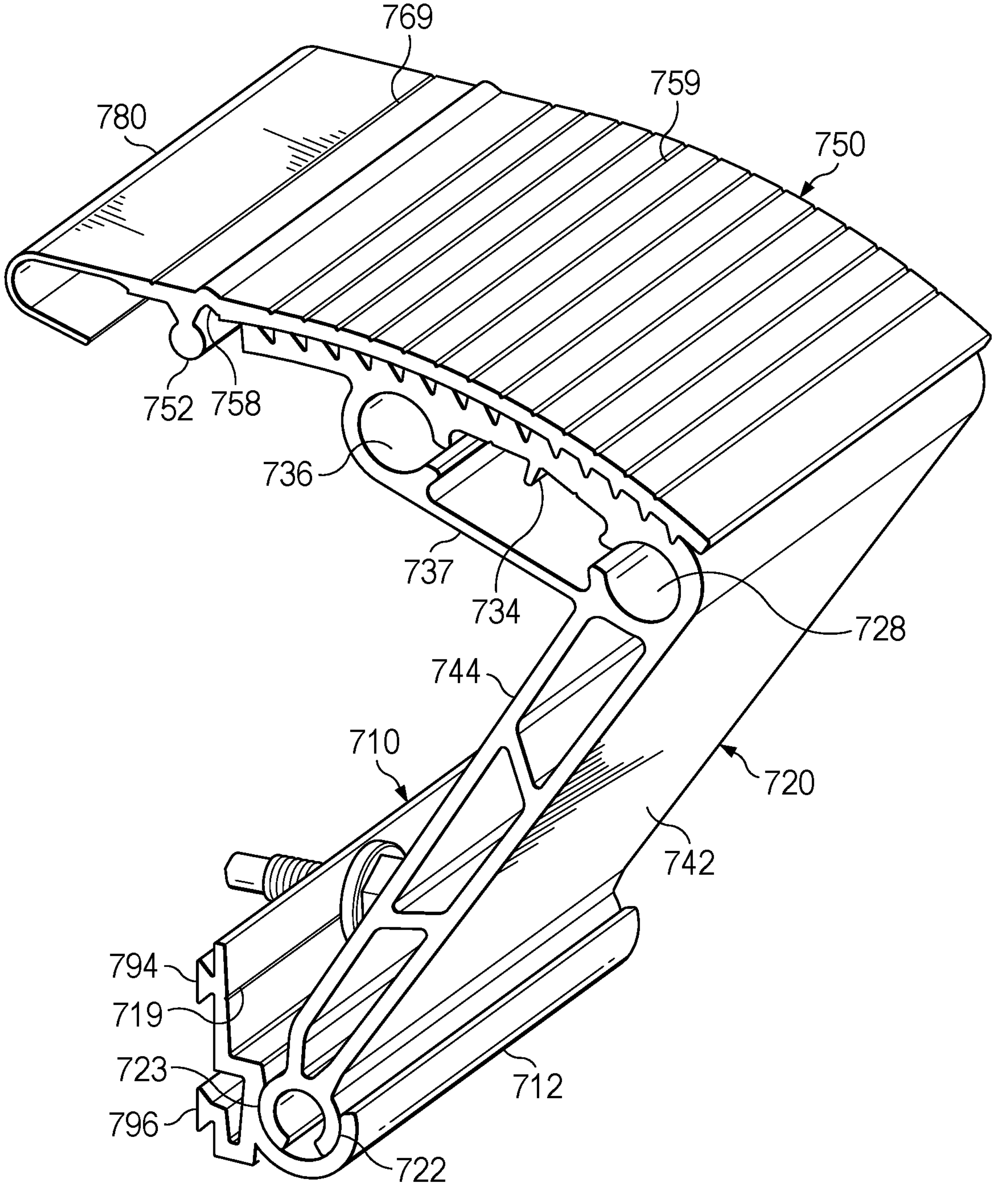
FIG. 7A is a perspective view of a ratcheting bracket assembly in a collapsed orientation, according to aspects of the present disclosure.

FIG. 7A is a perspective view of a ratcheting bracket assembly in a collapsed orientation, according to aspects of the present disclosure. As shown, the ratcheting bracket assembly of FIG. 7A may include a roller holder bracket 720, a base bracket 710, and a support bracket 750.

The base bracket 710 may be similar to the base bracket 210 described previously, with some variations. For example, the base bracket 710 may be affixed to an inner surface of the movable barrier 190. The base bracket 710 includes a protrusion 794 and a protrusion 796 configured to secure the base bracket 710 to the movable barrier 190 within grooves 194*d* and 196*d* (FIG. 3A). The base bracket 710 may be further coupled to the movable barrier 190 with a fastener, such as a screw, or nut and bolt, as shown.

The base bracket 710 additionally includes a socket 712. The socket 712 may be similar to the socket 212 previously described. However, the opening of the socket 712 may be oriented vertically upward allowing the corresponding socket head of the roller holder bracket 720 to be snapped downward into the socket 712 through the top opening. The socket 712 may be a substantially cylindrical shaped cavity. In that regard, the socket may be sized and shaped to receive the corresponding socket head of the roller holder bracket 720. For example, the socket head of the roller holder bracket 720 may be positioned within the socket 212 to form a joint The roller holder bracket 720 may be similar to the roller bracket 220 previously described with some variation. For example, the roller holder bracket may space a roller (e.g., the roller 230) from the inner surface of the movable barrier by any suitable distance and may include ratcheting features designed to interlock with corresponding ratcheting features of the support bracket 750.

The roller holder bracket 720 shown in FIG. 7A may be rotatably affixed to the base bracket 210. For example, as described above, the roller holder bracket 720 may include a socket head formed of features 722 and 723. The features 722 and 723 together form a substantially cylindrical shape corresponding to the shape of the socket 712. In some aspects, the socket head of the roller holder bracket 720 being formed of two opposing features 722 and 723 advantageously allows the socket head to be snapped into the socket 712 from above. For example, the features 722 and 723 may flex inward toward each other and the socket 712 may flex outward, away from the base bracket 710 allowing the features 722 and 723 to pass into the socket 712. This positioning may be performed during an installation of the roller bracket assembly.

The support bracket 750 shown in FIG. 7A may be similar to the support bracket 350 shown and described with reference to FIGS. 3A and 3B. For example, the support bracket 750 includes ratchet protrusions along an inner surface, a protrusion 752 configured to be received within the corresponding groove of the movable barrier (e.g., groove 198 shown and described with reference to FIG. 2), and a bias element 780.

As described with reference to the bias element 380, the bias element 780 may provide an upward force (e.g., the force in the direction 298 of FIG. 2) and a corresponding downward force (e.g., the force in the direction 299 of FIG. 2) preventing the ratchet protrusions of the support bracket 750 from disengaging the ratchet grooves of the roller holder bracket 720. To provide this force, the bias element 780 may include a curved structure of a thickness selected to maximize flexible resistance of the curved structure. The end of the curved structure may contact the upper surface of the movable barrier. In this configuration, as the end of the curved structure bears against the upper surface of the movable barrier 190, the curved region of the bias element 380 may flex, and resist deformation. This resistance creates a force in the direction 298 (FIG. 2) and a corresponding downward force in the direction 299 (FIG. 2).

As additionally shown in FIG. 7A, the outer surface of the support bracket 750 may include multiple grooves 759. The grooves 759 may be substantially similar to the grooves 359 previously described. In particular, the grooves 759 may extend across the upper surface of the support bracket 750 and provide multiple locations for fasteners during an installation of the bracket assembly. For example, a tip of a self-tapping screw or drill may be positioned within any of the grooves 759 during installation with the grooves 759 preventing the tip from moving the outer surface of the support bracket 350. A similar groove 769, is also shown on the other side of the protrusion 752 of the support bracket 750, the groove 769 being configured to receive or guide a self-tapping screw, other fastener, or drill bit. The groove 769 may be substantially similar to the groove 369 previously described (FIG. 3A).

The support bracket 750 includes an inner surface and an outer surface. The inner surface of the support bracket 250 may include multiple ratchet protrusions 757 (FIG. 8) extending inwardly from the inner surface. The roller holder bracket 720 includes an outer surface and an inner surface. The outer surface includes multiple ratchet grooves 739. The cross-sectional shape of the ratchet grooves 739 correspond to the cross-sectional shape of the ratchet protrusions 757. As described with reference to the ratcheting protrusions and grooves of FIG. 2 previously, the ratchet protrusions 757 may engage with the ratchet grooves 739 to hold the position of the roller holder bracket 720 in place during installation of the roller bracket assembly.

With the roller holder bracket 720 held in place by the ratchet protrusions 757 and grooves 739, an installer of the roller bracket assembly may affix the support bracket 750 to the roller holder bracket 720, for example, using one or more fasteners.

Like the roller holder bracket 220 described with reference to FIG. 2, the roller holder bracket 720 may include multiple roller holders. In some aspects, the multiple roller holders include the roller holder 736, and the roller holder 728. The positioning of these roller holders may be selected to maximize the range of distances the bracket assembly may space the roller from the movable barrier 190, as previously described. The roller holder 736 and the roller holder 728 may be substantially cylindrical. The roller holders may include gaps making the roller holders 736 and 728 as well as the cavity formed by the wall 737 a single unitary hole. Making the roller holders 736 and 728 and the hole between the two a single unitary hole, the manufacturing cost of the roller holder 720 may be reduced.

The wall 734 shown extending from the inner surface of the roller holder bracket 720 between the roller holders 736 and 728 defines two channels on either side of the wall 734. These channels may be sized and shaped to retain a nut used to secure the support backet 750 to the roller holder bracket 720, similar to the channels described with reference to FIG. 2.

As additionally shown in FIG. 7A, the roller holder bracket 720 may include an outer wall 742 extending from the socket head to the roller holders as well as an inner wall 744 along the same location. Multiple supporting structures may join the outer wall 742 and the inner wall 744, as illustrated. In some aspects, these two walls and supporting structures may increase the strength and overall rigidity of the roller holder bracket 720. As a result, the bracket assembly, in a collapsed or expanded state, may be able to resist larger loads caused by the bias element 780, the installer, the weight of the movable barrier after installation, or any other forces.

Similarly, an inner wall 737 extends from the roller holder 736 to the roller holder 728 as shown. In some aspects, the inner wall 737 also provides increased strength and rigidity to the roller holder bracket 720. In addition, the inner wall 737 may retain a nut positioned within the channels created by the wall 734. In that regard, when a bolt and nut are used to secure the support bracket 750 to the roller holder bracket 720, the nut may be slid into either of the channels shown. The nut may rest on the wall 737 as the bolt is driven through the support bracket 750 and engages with the nut, increasing ease of installation of the assembly.

The support bracket 750 additionally includes a groove 758 positioned adjacent to the protrusion 752. The groove 758 may align with an inner top edge of the movable barrier (e.g., the section 192*d* of FIG. 2) This groove 758 may allow increased rotational mobility of the support bracket 750 about the protrusion 752 and may optimize the downward force of the support bracket 750 engaging the ratcheting features of the roller holder bracket 720.

Figure 7B:
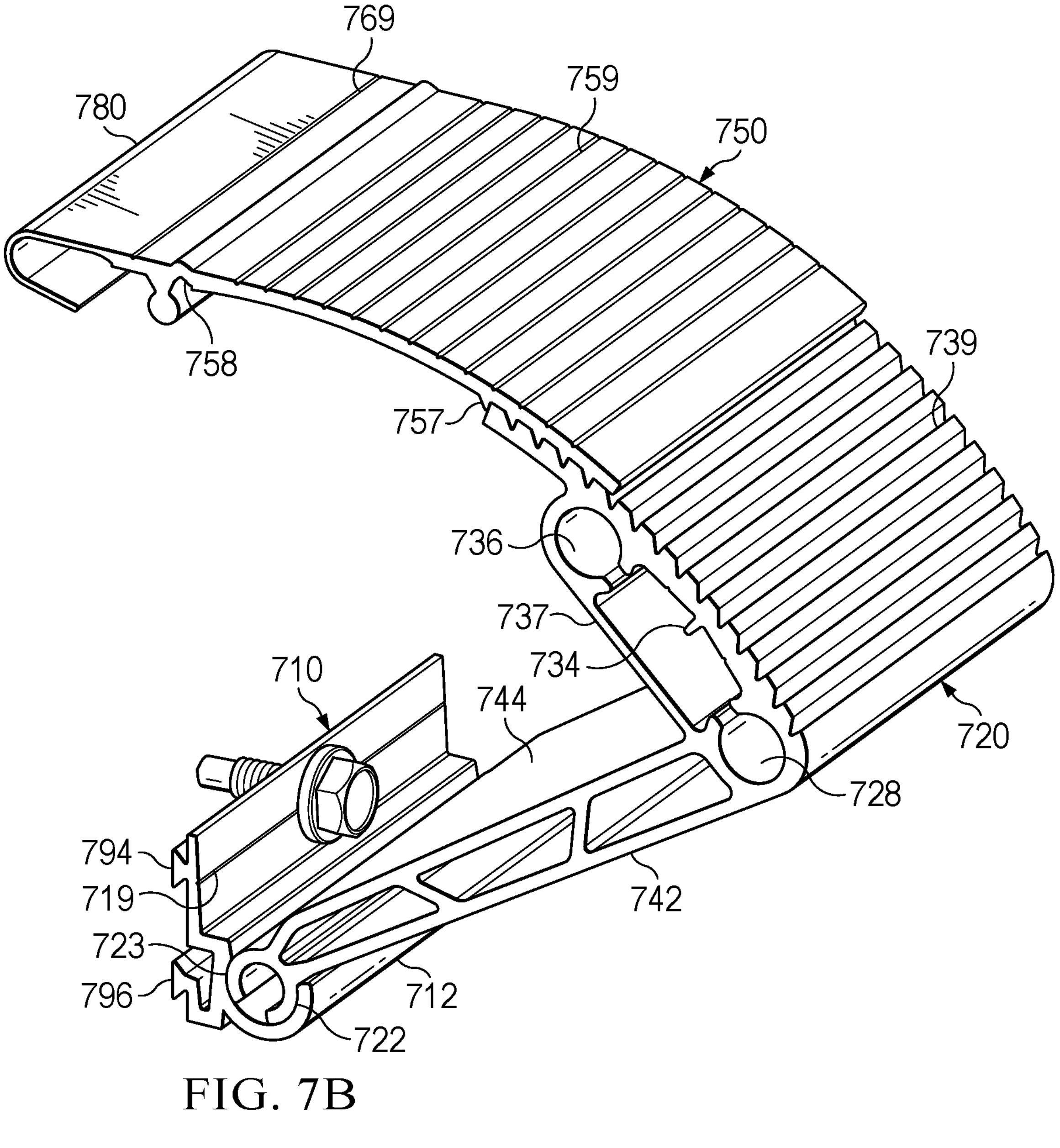
FIG. 7B is a perspective view of a ratcheting bracket assembly in an expanded orientation, according to aspects of the present disclosure.

FIG. 7B is a perspective view of a ratcheting bracket assembly in an expanded orientation, according to aspects of the present disclosure. Like FIG. 7A, FIG. 7B illustrates the roller holder bracket 720 and the base bracket 710 as well as the support bracket 750.

The orientation shown in FIG. 7B may correspond to an orientation of a ratcheting bracket assembly after the base bracket 710, the roller holder bracket 720, and the support bracket 750 have been installed. The orientation shown may also correspond to an orientation of the ratcheting bracket assembly after an installer of the ratcheting bracket assembly has pulled the roller holder bracket 720 and the top panel of the movable barrier in opposite directions. FIG. 7B also identifies ratchet protrusions 757 of the support bracket 750 as well as the ratchet grooves through 739 described previously. Based on the cross-sectional shape of the ratchet protrusions 757 and the ratchet grooves 739, these ratcheting features allow movement of the roller holder bracket 720 away from the movable barrier but prevent movement of the roller holder bracket 720 toward the movable barrier. In that regard, the orientation of the bracket assembly shown in FIG. 7B may correspond to an orientation prior to installation of fasteners securing the support bracket 750 to the movable barrier and the roller holder bracket 720, as well as the roller holder bracket 720 to the base bracket 710, and the base bracket 710 to the movable barrier.

In some aspects, an installation procedure of the bracket assembly shown and described with reference to FIGS. 7A and 7B may include the following steps. These steps may be performed in any suitable order and may include additional steps or may omit any of the steps provided. At a first step, the base bracket 710 is installed to the door rail by engaging the protrusions 794 and 796 (e.g., dovetail posts) into the rail grooves 194*d* and 196*d* (FIG. 2). The base bracket 210 is then secured with a screw or screws, as necessary. Next, the support bracket 750 is inserted into the seal groove 198 and slid along the groove 198 out of the way. The roller stem of the roller 230 is then inserted into one of the roller holders 736 and 728 of the roller holder bracket 720. The roller stem of the roller 230 may be inserted into the roller holder 728 (e.g., an extended roller holder) for maximum adjustment length or the roller holder 736 for shorter roller adjustment. The head of the roller is then inserted into the track 140. The socket head of the roller holder bracket 720 is then dropped into the socket (e.g., base groove) of the base bracket 210. A slight interference causes the socket head and socket to snap together. The support bracket 750 is then slid over the roller holder bracket 720 causing the ratch teeth & grooves to engage. The bracket assembly is adjusted to appropriate tightness of door against the wall by pulling the roller holder bracket 720 away from support bracket 750. The back curved feature (e.g., biasing element 780) of the support bracket 750 provides a light spring force to persuade the ratchet teeth to remain engaged during adjustment. Screws are used to secure the bracket assembly together using the grooves at the top of the support bracket 750 to prevent drill point on self-drilling screws from spinning astray.

Aspects of the bracket assemblies shown and described herein provide several advantages. The bracket assemblies disclosed do not require any pre-drilled or punched holes for installation, greatly reducing manufacturing cost and complexity as well as installation complexity. The individual parts of the bracket assemblies provided are extruded from aluminum and cut to length, which is an advantageously efficient and cost-effective process. The parts of the bracket assemblies may also be constructed of any width, which allows for simple manufacturing of bracket assemblies for single-end stile doors (e.g., 3 inches wide) as well as double-end stile doors (e.g., 5-6 inches wide for rollers with long stems). Installation of the bracket assemblies described is also significantly simplified because while adjusting the tightness of the top door section to the header/jamb, the ratchet features hold the bracket in place until the installer secures the assembly with self-drilling screws. Normally, an installer will push the section to the jamb while pulling the bracket roller holder away from the jamb in one motion. Somewhere in this process, the assembler must use another hand to secure the screw/nut preventing the section from "relaxing" away the jamb.

Figure 8:
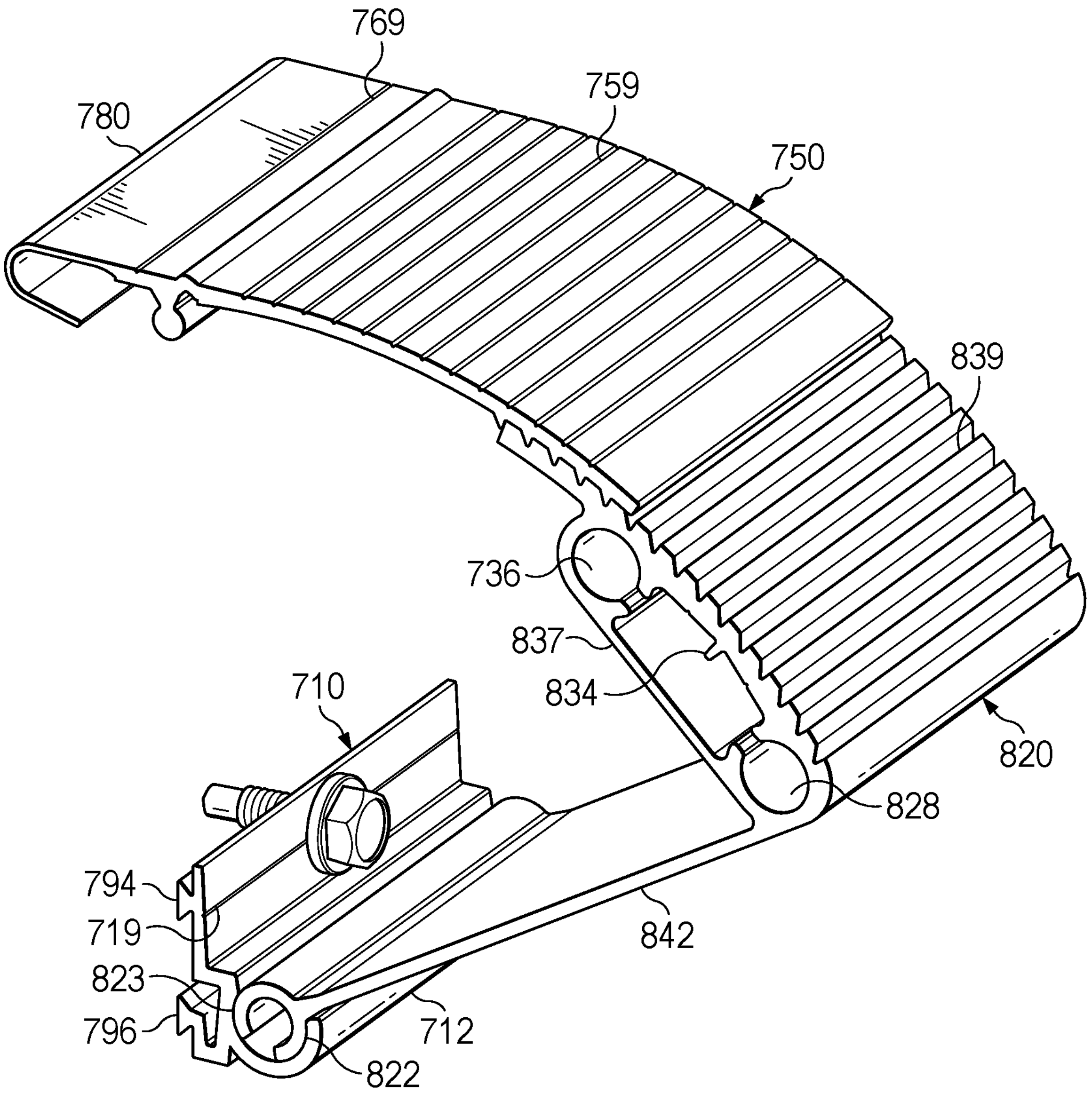
FIG. 8 is a perspective view of a ratcheting bracket assembly in an expanded orientation, according to aspects of the present disclosure.

FIG. 8 is a perspective view of a ratcheting bracket assembly in an expanded orientation, according to aspects of the present disclosure. The bracket assembly shown in FIG. 8 includes the base bracket 710, the support bracket 750, and a roller holder bracket 820. The roller holder bracket 820 includes a socket head formed of features 822 and 823, which are substantially similar to the features 722 and 723. The roller holder bracket 820 also includes ratches grooves 839 similar to the grooves 739, roller holders 837 and 828 similar to the roller holders 737 and 728, a wall 834 similar to wall 734, and a wall 842. The wall 842 may extend from the socket head formed by features 822 and 823 to the roller holder 828. The wall 842 may be similar to the walls 744 and 742 but may require less material and increase cost efficiency.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A roller bracket assembly for a movable barrier having a surface, the roller bracket assembly comprising:

a base configured to be coupled to a panel of the movable barrier, the base comprising a first portion of a joint; and a roller holder bracket comprising:

a first end comprising a second portion of the joint, the roller holder bracket being rotatably coupled to the base via the joint during installation, and configured to be fixedly coupled relative to the base during use; and a first roller tube supported by the first end and spaced from the surface of the movable barrier, the first roller tube configured to receive a roller stem.

2. The roller bracket assembly of claim 1, wherein the roller holder bracket further comprises a second end configured to be coupled to the movable barrier.

3. The roller bracket assembly of claim 1, wherein the first end of the roller holder bracket includes an opening configured to receive a fastener disposed to prevent rotation of the roller holder bracket.

4. The roller bracket assembly of claim 1, wherein the roller holder bracket further comprises a second roller tube configured to receive the roller stem.

5. The roller bracket assembly of claim 1, comprising a support bracket attachable to the roller holder bracket.

6. The roller bracket assembly of claim 5, wherein the support bracket comprises an outer surface having a plurality of grooves.

7. The roller bracket assembly of claim 5, wherein the roller holder bracket comprises an inner surface having a channel, the channel configured to receive a nut and prevent the nut from rotating within the channel.

8. The roller bracket assembly of claim 5, wherein:

the support bracket comprises an inner surface having first interlocking features; and the roller holder bracket comprises an outer surface having second interlocking features to attach the support bracket to the roller holder bracket.

9. The roller bracket assembly of claim 8, wherein the first interlocking features of the inner surface of the support bracket and the second interlocking features of the outer surface of the roller holder bracket are selectively lockable to allow movement of the roller holder bracket away from the surface of the movable barrier and prevent movement of the roller holder bracket toward the surface of the movable barrier.

10. The roller bracket assembly of claim 9, wherein the first interlocking features of the inner surface of the support bracket include ratchet protrusions, and wherein the second interlocking features of the outer surface of the roller holder bracket include ratchet grooves.

11. The roller bracket assembly of claim 10, wherein a protrusion of the support bracket and a groove of the movable barrier form a pivotable fulcrum.

12. The roller bracket assembly of claim 11, further comprising a bias element positioned between the support bracket and the movable barrier and configured to urge the inner surface of the support bracket toward the outer surface of the roller holder bracket.

13. A roller bracket assembly for a movable barrier having a surface, the roller bracket assembly comprising:

a first bracket configured to be coupled to the surface of the movable barrier, the first bracket comprising a first set of interlocking features;

a second bracket comprising:

a roller tube configured to receive a roller stem; and a second set of interlocking features configured to mate with the first set of interlocking features of the first bracket; and a third bracket couplable to the movable barrier, wherein a first end of the second bracket is configured to be rotatably coupled to the third bracket.

14. The roller bracket assembly of claim 13, wherein the first set of interlocking features and the second set of interlocking features are configured to allow movement of the second bracket away from the surface of the movable barrier and prevent movement of the second bracket toward the surface of the movable barrier.

15. The roller bracket assembly of claim 13, further comprising a bias element positioned between the first bracket and the movable barrier causing a first surface of the first bracket to bear against a second surface of the second bracket.

16. A roller bracket assembly for a movable barrier having a surface, the roller bracket assembly comprising:

a first bracket configured to be coupled to the surface of the movable barrier, the first bracket comprising a first set of interlocking features;

a second bracket comprising:

a roller tube configured to receive a roller stem; and a second set of interlocking features configured to mate with the first set of interlocking features of the first bracket; and a bias element positioned between the first bracket and the movable barrier causing a first surface of the first bracket to bear against a second surface of the second bracket.

* * * * *